3,561,845
Patented Feb. 9, 1971

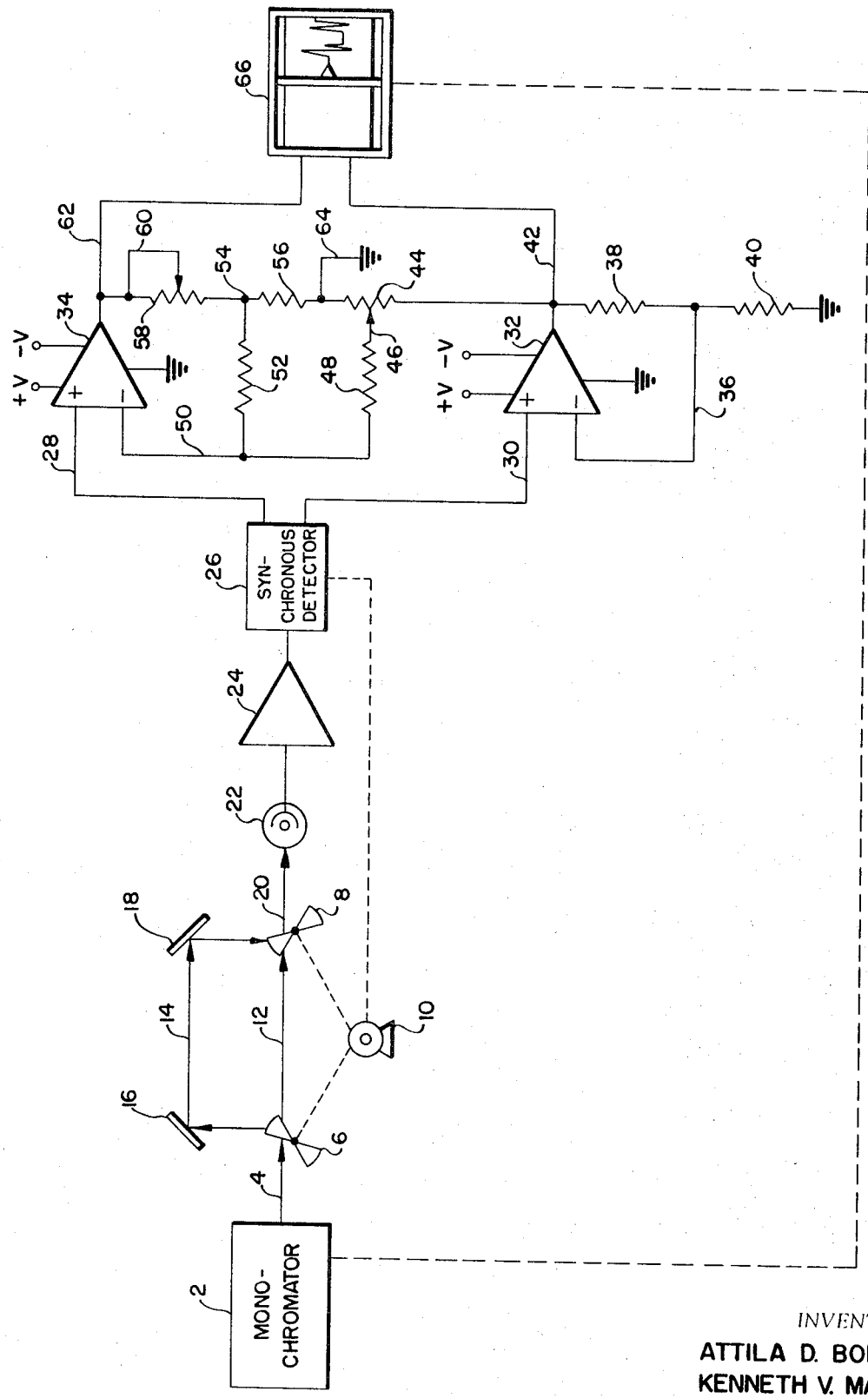

3,561,845
RADIANT ENERGY ANALYZER INCLUDING MEANS FOR OFFSETTING AND SCALING THE RATIO OF TWO SIGNALS
Attila D. Boronkay, La Habra, and Kenneth V. Matthews, Garden Grove, Calif., assignors to Beckman Instruments, Inc., a corporation of California
Filed June 2, 1969, Ser. No. 829,668
Int. Cl. G01d *3/42;* G01j *3/08;* G01n *21/27*
U.S. Cl. 356—205　　　　　　　　　　　　　　　　　4 Claims

ABSTRACT OF THE DISCLOSURE

There is disclosed a circuit in a radiant energy analyzer for offsetting and scaling the ratio of two signals. The circuit in part comprises a first channel and a second channel amplifying device. A first signal is connected to the first channel amplifying device the output of which is connected to a first voltage divider component. A second signal is connected to the second channel amplifying device the output of which is connected to a second voltage divider component. The second divider is connected to the second channel amplifying device so as to provide a portion of the second channel amplifying device signal output as degenerative feedback. The first divider is connected to the second channel amplifying device so as to provide a portion of the first channel amplifying device output signal in series with the second channel amplifying device feedback. The ratio of the second signal to the first signal at the output of the amplifying devices is equal to a scale factor times the difference between the input signal ratio and an offset term where the offset is determined by the first divider and the scale factor by the second divider.

---

This invention relates to a circuit in a radiant energy analyzer for translating (offsetting) and amplifying (scaling) the ratio of two signals and more particularly to offsetting the ratio of a sample signal to a reference signal and scaling the resultant offset ratio.

Offsetting and scaling the ratio of two signals finds utilization in radiant energy analyzers and spectrophotometers wherein the relative transmission of a reference and sample beam of energy are compared by ratiometric techniques. Since this type of instrumentation is concerned with the percent transmission of a sample beam relative to a reference beam, the ratio of a detected sample signal to a detected reference signal is the function of interest. This ratio is obtained by applying the two signals as inputs to a ratio recorder. The ratio recorder computes the ratio and records the result, usually on a strip chart calibrated in percent transmission.

It is often desirable to expand a portion of the transmission scale to obtain an amplified recording of the transmission parameter over a given range. In particular, a spectrophotometer recording in which transmission is recorded as a function of spectrum wavelength often demands such a scale expansion to enable examination of fine structure detail of spectrum transmission otherwise not possible.

The problem encountered in scale expansion of the ratio of two signals involves amplifying and offsetting a desired transmission scale segment, from say transmission $T_1$ to $T_2$, such that the lower boundary $T_1$ corresponds to the recorder zero point and the upper boundary $T_2$ to the recorder full scale point. The specific problem is to provide an offset adjustment such that the offset $T_1$ produced thereby is independent of a scale expansion adjustment used to obtain the expanded scale range covering $T_1$ to $T_2$. Therefore, if the scaling adjustment were changed to cover a new range of $T_1$ to $T_3$, $T_1$ would still appear at the recorder zero point without any need for changing the offset adjustment and $T_3$ would now correspond to the recorder full scale point.

The present techniques utilized for offset and scaling have proved unsatisfactory. Offset has usually been accomplished by using a fixed potential such as a battery as the source of offset added or subtracted from one of the signals. A voltage divider or potentiometer connected across the battery is used to vary the amount of offset required in a particular application. Since the offset is derived from a fixed source, the expanded scale zero is not maintained at recorder zero when the sample and reference signals change in response to common sources of variation although the ratio remains constant.

Scale expansion is usually accomplished by providing a sample signal larger in amplitude than necessary and using an attenuator to reduce the magnitude to a level desired for the appropriate scale. As a result, more amplification is required and high levels of signal are maintained than is necessary for unexpanded scale recording and the offset changes with attenuation.

Accordingly, it is the object of the present invention to provide a circuit in a radiant energy analyzer for offsetting and scaling the ratio of a sample to a reference signal where the offset of the ratio is not a function of the scaling.

Another object is to provide a circuit in a radiant energy analyzer for offsetting and scaling the ratio of two signals wherein the offset adjustment does not affect the scale adjustment.

A further object of the present invention is to provide a circuit in a radiant energy analyzer for offsetting and scaling the ratio of two signals, such apparatus having a high input impedance at each of two inputs so as to be compatible with low impedance driving sources and a low impedance output at two outputs so as to be compatible with high impedance loads.

A still further object of the present invention is to provide a double-beam, radiant energy analyzer having sample and reference signals connected to an offset scaling circuit having a sample and a reference channel wherein the sample signal is variably offset by a fraction of the reference channel output and variably amplified by the sample channel gain providing a scale expansion thereby and wherein a ratio of the sample channel output to the reference channel output is displayed on a ratio recorder.

The above objects along with other features and objects of the invention will be better understood from a consideration of the detailed description when read in conjunction with the attached drawing in which the single figure is an exemplary embodiment of an offset and scaling radiant energy analyzer constructed in accordance with the teachings of the present invention.

Referring now to the drawing, a monochromator 2 produces a narrow band of radiation at a particular wavelength variable in accordance with the monochromator and synchronized with the pen or paper drive of recorder 66. The radiation 4 is directed to rotating sector mirrors 6 and 8 driven in synchronism by motor 10 so as to alternatively pass radiation beam 4 either through sample path 12 or reference path 14. Mirrors 16 and 18 further direct the reference path energy. The alternate sequences of energy from the sample and reference path are directed along path 20 to radiation detector 22 which is connected to amplifier 24. Synchronous detector 26 connected to the output of amplifier 24 provides a switching mechanism operated in synchronism with motor 10 and sector mirrors 6 and 8 so as to produce two output signals, one on line 28 proportional to the energy and the signal in the sample signal path and the other on line 30 proportional to the energy and the signal in the reference path. The circuit configuration between lines 28 and 30 and lines 62 and 42 is the offset and scaling circuit, consisting of a reference signal channel and a sample signal channel.

Line 28 is connected to a noninverting input of amplifier 34 which has an output connected to line 62, the input line 28 to the output lines 62 being the sample channel. Line 62 is also connected to one input of a ratio recorder 66. Also connected to line 62 is potentiometer 58 having a variable tap 60. Resistor 52 is connected in turn from potentiometer 58 to the inverting input of amplifier 34. Resistor 56 is connected between the juction of potentiometer 58 and resistor 52 and the offset and scaling circuit common or ground 64.

Line 30 is connected to the noninverting input of amplifier 32 which has an output connected by line 42 to the other input to the recorder 66. Line 30 to line 42 constitutes the reference channel of the offset and scaling circuit. Resistor 38 in series with resistor 40 is connected between line 42 and the offset and scaling circuit common. A noninverting input of amplifier 32 is connected to the juction of resistor 38 and 40. Also connected between line 42 and the offset and scaling common is potentiometer 44. Resistor 48 is connected between the variable tap 46 of potentiometer 44 and the inverting input of amplifier 34.

Considering now the operation of the offset and scaling circuit configuration the reference signal of the analyzer is applied to line 30 of amplifier 32 where it is amplified and appears at line 42. The sample signal is applied to line 28 of amplifier 34 where it is amplified along with a portion of the reference channel output signal appearing at line 42. Therefore as will become apparent hereinbelow, the ratio of the signal appearing at line 62 to that appearing at line 42 is offset and scaled as compared to the ratio of the signal appearing at line 28 to that appearing at line 30.

Amplifier 34 is connected in a potentiometric feedback configuration having a gain determined by the ratio of the sum of the resistances of potentiometer 58, connected as a variable resistor, plus resistor 56 to that of resistor 56. Since the inverting input of amplifier 34 draws negligible current in view of a high input impedance associated therewith, the current that flows through resistors 48 and 52 is essentially the same. Since amplifier 34 is a high gain differential amplifier, the voltage at line 50 is essentially the sample signal voltage which appears at line 28. Therefore, the voltage across resistor 48 is the difference between the sample signal voltage appearing at line 28 and a portion of the reference channel output voltage appearing at line 42. Letting $V_{42}$ equal the reference channel signal voltage appearing at line 42, then $$V_{42} = \frac{(R_{38}+R_{40})}{R_{40}} \cdot V_{30} \quad (1)$$

where $V_{30}$ is the reference channel inptu signal voltage at line 30. Letting $V_{46}$ equal the voltage at variable tap 46 of potentiometer 44, then $$V_{46} = CV_{42} \quad (2)$$

where C is the fraction set by the potentiometer 44. Therefore the current $i_{48}$ through resistor 48 is $$i_{48} = \frac{(V_{28}-CV_{42})}{R_{48}} \quad (3)$$

where $V_{28}$ is the voltage at lines 28 and 50 and $R_{48}$ is the resistance by which a fraction of the reference channel voltage is connected into the sample channel of the offset and scaling circuit. Since it is desired to provide a scaling adjustment insensitive to offset adjustment, $R_{48}$ and $R_{52}$ are large resistances relative to the potentiometers 58 and 44 and resistor 56. Therefore, $$V_{62} = \left[ V_{28} + \frac{(V_{28}-CV_{42})R_{52}}{R_{48}} - \frac{R_{52}CV_{42}}{R_{48}} \right] \frac{(R_{58}+R_{56})}{R_{56}} \quad (4)$$

where $V_{62}$ is the sample channel output signal voltage at line 62. Collecting terms, $$V_{62} = \left[ V_{28}\frac{(R_{48}+R_{52})}{R_{48}} - \frac{R_{52}CV_{42}}{R_{48}} \right] \frac{(R_{58}+R_{56})}{R_{56}} \quad (5)$$

Dividing both sides by $V_{42}$ to obtain the ratio $V_{62}$ to $V_{42}$ and then substituting for $V_{62}$ in the right half of Equation (5), $$\frac{V_{62}}{V_{42}} = \left[ \frac{V_{28}(R_{48}+R_{52})R_{40}}{V_{30}R_{48}(R_{38}+R_{40})} - \frac{R_{52}C}{R_{48}} \right] \frac{(R_{58}+R_{56})}{R_{56}} \quad (6)$$

Letting $R_{48}=R_{52}$ and $R_{40}=R_{38}$, then $$\frac{V_{62}}{V_{42}} = \frac{(R_{58}+R_{56})}{R_{56}} \left[ \frac{V_{28}}{V_{30}} - C \right] \quad (7)$$

It should be evident from Equation 7 that the ratio of $V_{62}$ to $V_{42}$ is related to the ratio of $V_{28}$ to $V_{30}$ by an offset equal to C which is the voltage division provided by the potentiometer 44 and scaled by the gain of amplifier 34 determined by the ratio of the sum of $R_{58}$ plus $R_{56}$ to $R_{56}$. Also, it should be apparent from Equation 7 that the offset C is independent of the scaling $(R_{58}+R_{56})/R_{56}$ as well as the scaling independent of the offset.

To demonstrate an application of the radiant energy analyzer with offset and scaling, consider a sample to reference signal ratio ranging from .70 or 70 percent transmission to .90 or 90 percent transmission. It is desired to display only the segment of the ratio scale from .70 to .90. Therefore, the ratio .70 must appear as a zero input into the ratio recorder 66 so that the pen is in the chart zero position. The potentiometer 44 is adjusted so that the voltage division provided thereby essentially is equal to .70, the minimum ratio in the range of the scale segment to be expanded. With the ratio of the sample channel input signal to the reference channel input signal set at .90 for calibartion, the potentiometer 58, connected as a variable resistor, is adjusted to provide sufficient gain for amplifier 34 to cause the ratio recorder pen to read full scale on the recording chart. The potentiometers 58 and 44 can be precalibrated to provide the necessary offset and scaling without the need for reference and sample channel calibrating signals.

The following are specific examples of components which have been found suitable for a circuit constructed like that shown in FIG. 1:

Amplifiers 34 and 32—Fairchild AD019 Amplifier
Resistors 38 and 40—5K
Resistors 48 and 52—10 meg.
Resistor 56—10K
Potentiometer 58—100K
Potentiometer 44—10K
+V—+15 volts
−V——15 volts It now should be apparent that the present invention provides an offset and scaling circuit in a radiant energy analyzer employing a minimum of active and passive components and which provides an offset and scaling each independent of the other. Although particular components and voltages have been discussed in connection with the specific embodiment of the circuit constructed in accordance with the teachings of the present invention, others may be utilized. Furthermore, it will be understood that although an exemplary embodiment of the present invention has been disclosed and discussed, other applications and circuit arrangements are possible and that the embodiment disclosed may be subjected to various changes, modifications and substitutions without necessarily departing from the present invention.

What is claimed is:

1. In a radiant energy analyzer of the type producing an electrical reference signal proportional to radiant energy traversing a reference path and an electrical sample signal proportional to the radiant energy traversing a sample path, an offset and scaling circuit comprising:
   reference channel means having an input and an output, said input being connected to receive said reference signal;
   sample channel means having an input and an output, said input being connected to receive said sample signal;
   offset means connected between said reference and sample channel means to subtract a fraction of the reference channel output signal from the sample channel output signal;
   means connected to said sample channel means to control the gain of said sample channel means; and,
   ratio indicating means having a first input connected to said sample channel output signal and a second input connected to said reference channel output signal for indicating an output ratio of said sample channel output signal to said reference channel output signal whereby said output ratio is equivalent to an input ratio of said sample channel input signal to said reference channel input signal offset by said fraction and scalled by said gain of said sample channel.

2. The radiant energy analyzer defined in claim 1 wherein said reference channel means comprises:
   a differential amplifier having an inverting input, a non-inverting input connected to receive said reference signal, an output, and a common terminal;
   a first resistor connected between said output and said inverting input; and,
   a second resistor connected between said inverting input and said common terminal whereby the amplification between said non-inverting input and said output is determined by the ratio of the sum of said first and second resistors to said second resistor.

3. The radiant energy analyzer defined in claim 2 wherein said sample channel means and means to control the gain of said sample channel means comprise:
   a differential amplifier having an inverting input, a non-inverting input connected to receive said sample signal, an output and a common terminal, said common terminal being connected to said reference channel differential amplifier common terminal;
   a variable resistor having first and second terminals, said first terminal being connected to said output;
   a first resistor connected between said variable resistor second terminal and said inverting input; and,
   a second resistor connected between said variable resistor second terminal and said common terminal whereby the amplification between said non-inverting input and said output is determined by the ratio of the sum of said variable resistor and said second resistor to said second resistor.

4. The radiant energy analyzer defined in claim 3 wherein said offset means comprises:
   a potentiometer connected between said reference channel output and said common terminal, said potentiometer having a variable tap; and,
   a resistor connected between said potentiometer variable tap and said sample channel differential amplifier inverting input whereby said variable tap provides said adjustable fraction of the reference channel output signal to provide said offset.

References Cited

UNITED STATES PATENTS 2,678,581   5/1954   Reisner _____ 356—205

RONALD L. WIBERT, Primary Examiner

O. B. CHEW II, Assistant Examiner

U.S. Cl. X.R.

356—95, 97; 250—214

PO-1050
(5/69)

UNITED STATES PATENT OFFICE
CERTIFICATE OF CORRECTION

Patent No. 3,561,845      Dated February 9, 1971

Inventor(s) Attila D. Boronkay and Kenneth V. Matthews

It is certified that error appears in the above-identified patent and that said Letters Patent are hereby corrected as shown below:

Column 2, line 20, "high" should be --higher--; column 3, line "juction" should be --junction--; column 3, line 56, "inptu" should be --input--; column 4, line 42, "calibartion" should read --calibration--; column 5, line 27, "scalled" should re --scaled--.

Column 4, Equation 4, should read:

$$V_{62} = \left[ V_{28} + \frac{(V_{28} - CV_{42})R_{52}}{R_{48}} \right] \cdot \frac{(R_{58} + R_{56})}{R_{56}}$$

Signed and sealed this 29th day of June 1971.

(SEAL)
Attest:

EDWARD M. FLETCHER, JR.      WILLIAM E. SCHUYLER, JR.
Attesting Officer      Commissioner of Patents